US007495184B1

(12) United States Patent
Gretz (10) Patent No.: US 7,495,184 B1
(45) Date of Patent: *Feb. 24, 2009

(54) ELECTRICAL FITTING FOR SNAP IN CONNECTION OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/069,224

(22) Filed: Feb. 8, 2008

Related U.S. Application Data

(63) Continuation-in-part of application No. 11/726,150, filed on Mar. 21, 2007, now Pat. No. 7,329,144, which is a continuation-in-part of application No. 11/591,199, filed on Nov. 1, 2006, now Pat. No. 7,304,251, which is a continuation-in-part of application No. 11/521,957, filed on Sep. 15, 2006, now Pat. No. 7,226,309, which is a continuation-in-part of application No. 11/494,665, filed on Jul. 27, 2006, now Pat. No. 7,154,054, and a continuation-in-part of application No. 11/494,663, filed on Jul. 27, 2006, now Pat. No. 7,161,095, which is a continuation-in-part of application No. 11/300,859, filed on Dec. 15, 2005, now Pat. No. 7,238,894.

(51) Int. Cl.
*H02G 3/18* (2006.01)

(52) U.S. Cl. .................. 174/655; 174/653; 174/659; 174/668; 174/135; 16/2.1; 439/552

(58) Field of Classification Search .......... 174/650–669, 174/152 G, 135, 59–61; 439/552, 557, 142, 439/460, 463, 470; 16/2.1, 2.2; 248/56; 285/194, 921
See application file for complete search history.

(56) References Cited

U.S. PATENT DOCUMENTS

| | | | | |
|---|---|---|---|---|
| 3,227,803 A | * | 1/1966 | Gohs | ............................ 174/78 |
| 4,324,503 A | * | 4/1982 | Sevrence | ..................... 403/197 |
| 6,106,031 A | * | 8/2000 | Guginsky | .................... 285/369 |
| 6,113,435 A | * | 9/2000 | Anderson et al. | ........... 439/687 |
| 6,521,831 B1 | | 2/2003 | Gretz | |
| 7,045,714 B1 | | 5/2006 | Kiely | |
| 7,151,223 B2 | | 12/2006 | Auray et al. | |
| 7,154,042 B2 | | 12/2006 | Auray et al. | |
| 7,161,095 B1 | * | 1/2007 | Gretz | ......................... 174/655 |

* cited by examiner

*Primary Examiner*—Dhiru R Patel (57) ABSTRACT

An electrical fitting with an improved arrangement on the trailing end for securing an electrical cable to a panel or an electrical box. The electrical fitting may include a single bore on the trailing end for connecting a single electrical cable to a knockout or two bores for securing two cables to a single knockout opening. The electrical fitting include a connector body having a leading body portion and a trailing body portion. The leading body portion may include a snap ring for snap-in connection to the panel or box or a threaded nose portion and locknut. The trailing body portion may include one or two inlet bores therein for the insertion of electrical cables. The improved arrangement for inserting a cable on the trailing end of the fitting includes an improved tandem tang with a common middle portion and a leading and trailing tang extending therefrom. A portion connecting the trailing tang to the common middle portion is of arcuate shape. The improved tandem tang enables easier insertion of electrical cables within the trailing end of the fitting.

8 Claims, 7 Drawing Sheets

ELECTRICAL FITTING FOR SNAP IN CONNECTION OF CABLES

This application is a Continuation-In-Part of U.S. patent application Ser. No. 11/726,150 filed Mar. 21, 2007, now U.S. Pat. No. 7,329,144, which is a Continuation-In-Part of U.S. patent application Ser. No. 11/591,199 filed Nov. 1, 2006, now U.S. Pat. No. 7,304,251, which is a Continuation-In-Part of U.S. patent application Ser. No. 11/521,957 filed Sep. 15, 2006, now U.S. Pat. No. 7,226,309, which is a Continuation-In-Part of U.S. patent application Ser. No. 11/494,665 filed Jul. 27, 2006, now U.S. Pat. No. 7,154,054 and a Continuation-In-Part of U.S. patent application Ser. No. 11/494,663 filed Jul. 27, 2006, now U.S. Pat. No. 7,161,095, which patents are Continuation-In-Parts of U.S. patent application Ser. No. 11/300,859 filed Dec. 15, 2005, now U.S. Pat. No. 7,238,894.

FIELD OF THE INVENTION

This invention relates to fittings for connecting electrical cables to a panel or an electrical box and specifically to a duplex electrical fitting having an improved arrangement on the trailing end for receiving electrical cables.

BACKGROUND OF THE INVENTION

Electrical fittings having an improved arrangement on the trailing end for the attachment of electrical cables were disclosed in co-pending U.S. application Ser. No. 11/726,150 and in U.S. Pat. Nos. 7,154,054, 7,161,095, 7,226,309, and 7,238,894, and 7,304,251, which are commonly owned by the assignee of the present invention and the contents of which are incorporated herein in their entirety by reference thereto. Instead of the split ring being located within the tubular body as shown in prior art electrical fittings, the improved arrangement included single or tandem cable gripping tangs that are fastened externally to the tubular body and therefore are easily accessible.

The present invention provides an electrical fitting that incorporates the several advantages of the simplex electrical fitting of U.S. Pat. No. 7,154,054 and the duplex electrical fitting of U.S. Pat. No. 7,161,095 while improving those fittings by providing an improved tandem tang which enables easier insertion of the electrical cable or cables into the fitting. The tandem tang of the present invention includes a trailing leg with a pronounced curve at its juncture with the common middle portion. With the tandem tang of the present invention, the insertion of the electrical cables into the trailing end of the electrical fitting is easier when the electrical cables are secured thereto to the trailing end of the connector. The electrical connector of the present invention thereby enables easier insertion of electrical cables into the inlet bores at the trailing end of the connector.

SUMMARY OF THE INVENTION

The invention is an electrical fitting with an improved arrangement on the trailing end for securing an electrical cable to a panel or an electrical box. The electrical fitting may include a single bore on the trailing end for connecting a single electrical cable to a knockout or two bores for securing two cables to a single knockout opening. The electrical fitting include a connector body having a leading body portion and a trailing body portion. The leading body portion may include a snap ring for snap-in connection to the panel or box or a threaded nose portion and locknut. The trailing body portion may include one or two inlet bores therein for the insertion of electrical cables. The improved arrangement for inserting a cable on the trailing end of the fitting includes an improved tandem tang with a common middle portion and a leading and trailing tang extending therefrom. A portion connecting the trailing tang to the common middle portion is of arcuate shape. The improved tandem tang enables easier insertion of electrical cables within the trailing end of the fitting.

OBJECTS AND ADVANTAGES

Several advantages are achieved with the electrical fitting of the present invention, including:
(1) Insertion of electrical cables within the bores in the trailing end of the electrical fitting is substantially easier as a result of the curved trailing leg on the tandem tang.
(2) The fitting will accommodate cables of several trade sizes. This enables production of a few sizes of fittings to accommodate the entire range of standard cable sizes available.
(3) Stocking requirements for electrical suppliers are vastly reduced as a result of the reduction in the reduction in the amount of electrical fittings necessary to accommodate the range of cable sizes.
(4) An internal ring with gripping members is not required, thereby simplifying the production of the fitting and reducing the cost of manufacture.

These and other objects and advantages of the present invention will be better understood by reading the following description along with reference to the drawings.

INDEX TO REFERENCE NUMERALS IN DRAWINGS 30 electrical fitting
32 connector body
34 leading end
36 trailing end
38 flange
40 leading opening
42 trailing opening
44 open channel
46 channel bottom
48 bridge
50 tandem tang or clip member
52 fastener
54 electrical cable
56 electrical cable
58 center portion or common middle portion of tandem tang
60 leading tang
62 trailing tang
64 arcuate-shaped portion
66 aperture
68 leg
68A first leg

DETAILED DESCRIPTION OF THE INVENTION

Figure 1:
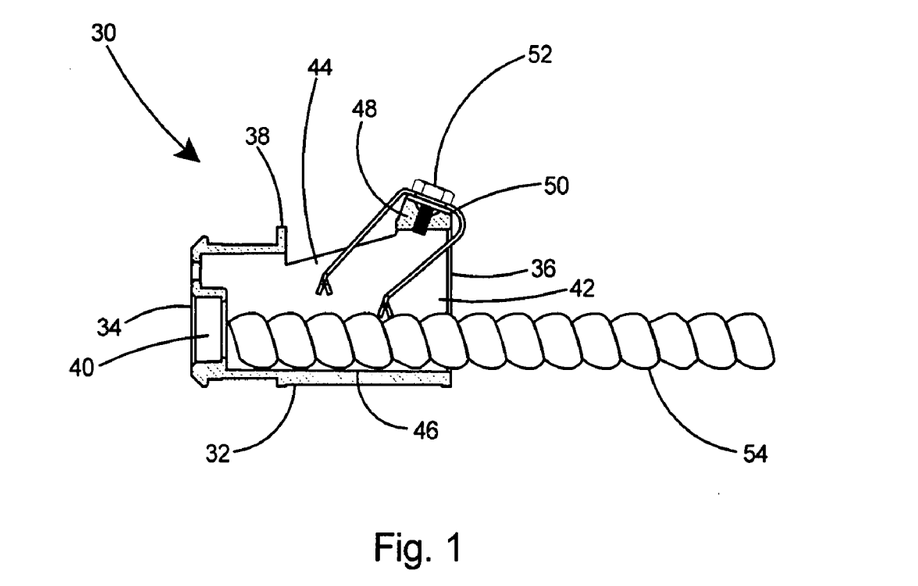
FIG. 1 is a sectional view of an electrical fitting with an improved tandem tang according to the present invention for connecting a single electrical cable to a knockout opening.

With reference to FIG. 1 there is shown a first embodiment of the present invention, an electrical fitting 30 having an improved arrangement for the securing of electrical cables thereto. The electrical fitting 30 includes a substantially tubular connector body 32 including a leading end 34 and a trailing end 36 separated by an intermediate flange 38. The connector body 32 includes a leading opening 40 at the leading end 34 and a trailing opening 42 at the trailing end 36. The trailing end 36 of the connector body 32 includes an open channel 44 extending from the trailing opening 42 to the flange 38. The connector body 32 includes a channel bottom 46 at the bottom of the open channel 44. A bridge 48 adjacent the trailing opening 42 bridges the open channel 44 and a clip member or tandem tang 50 is secured to the bridge 48 by a fastener 52. As shown in FIG. 1, an electrical cable 54 may be inserted into the trailing opening 42 at the trailing end 36 of the connector body 32.

Figure 2:
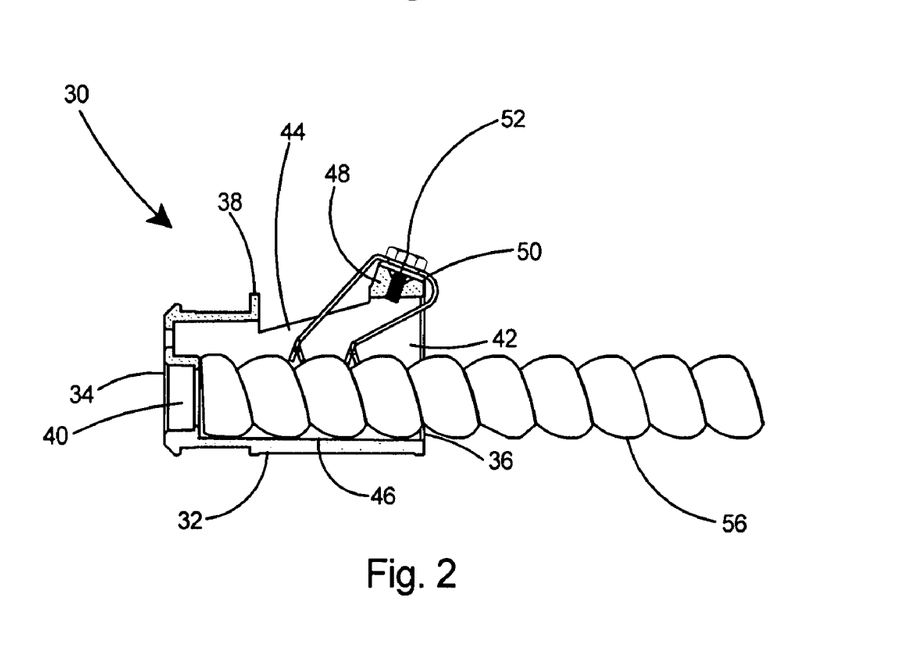
FIG. 2 is an electrical fitting identical to that shown in FIG. 1 but with a larger trade size electrical cable inserted therein in the trailing end of the fitting.

As shown in FIG. 2, the electrical fitting 30 of the present invention is capable of accepting a wide range of electrical cables, including a wide range of cable diameters. FIG. 2 depicts the same electrical fitting 30 as depicted in FIG. 1, but with a wider diameter electrical cable 56 inserted in the trailing end 36 of the fitting 30.

Figure 3:
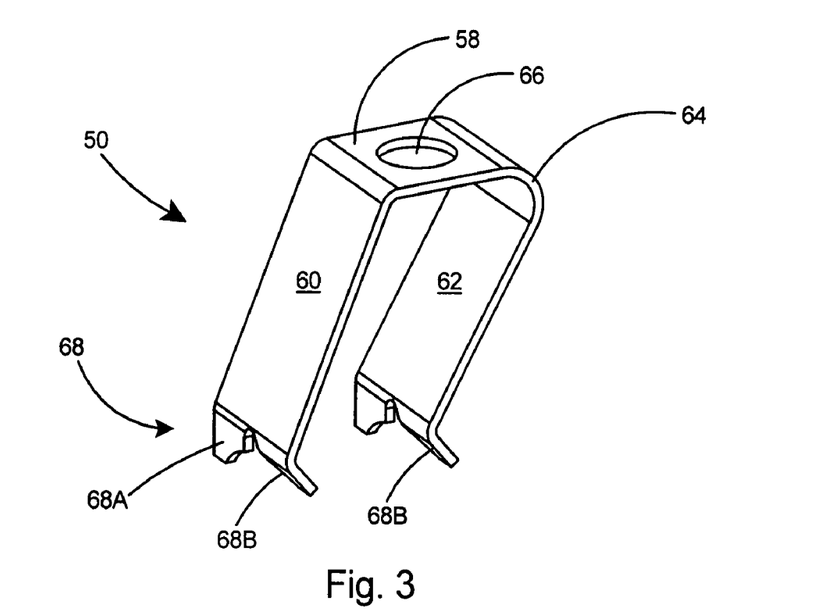
FIG. 3 is a perspective view of an improved tandem tang according to the present invention which forms a portion of the electrical fitting of FIG. 1.

With reference to FIG. 3 there is shown an especially preferred embodiment of a tandem tang 50 that forms a portion of the electrical fitting of the present invention. The tandem tang 50 includes a center portion 58, a leading tang 60, and a trailing tang 62. An arcuate-shaped portion 64 connects the center portion 58 to the trailing tang 62. An aperture 66 is provided in the center portion 58 of the tandem tang 50.

Figure 4:
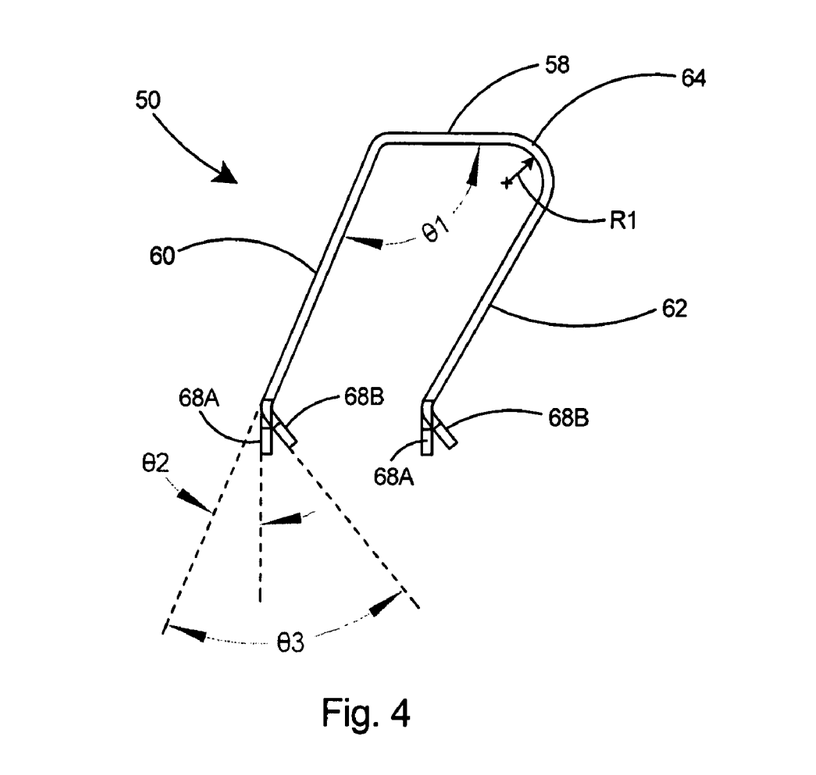
FIG. 4 is a side view of the tandem tang depicted in FIG. 3.

As shown in FIG. 4, the leading tang 60 is bent at a first angle $\Theta 1$ with respect to the center portion 58 and the radius R1 of the arcuate-shaped portion 64 is preferably at least 0.10-inch. The tandem tang 50 includes two legs 68 at the end of each tang 60 and 62. The first leg 68A on each tang is preferably at an angle $\Theta 2$ of between 20 and 25 degrees with respect to the tang 60 and 62 and the second leg 68B is preferably at an angle $\Theta 3$ of between 60 and 65 degrees with respect to the tang 60 and 62. Most preferably, the first leg 68A on each tang is at an angle $\Theta 2$ of 23 degrees with respect to the tang 60 and 62 and the second leg 68B is at an angle $\Theta 3$ of 63 degrees with respect to the tang 60 and 62. The tandem tang 50 is preferably constructed of spring steel. The two legs 68A and 68B function as cable grabbing ends for capturing an electrical cable as it is inserted within the electrical fitting of the present invention.

Figure 7:
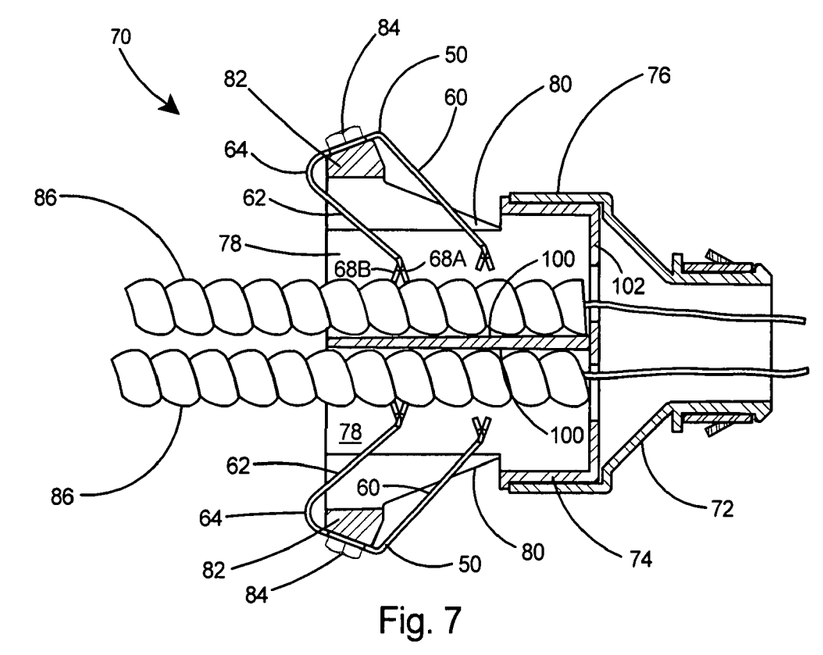
FIG. 7 is a sectional view of a duplex electrical fitting with two improved tandem tangs according to the present invention for connecting two electrical cables to a knockout opening.
Figure 8:
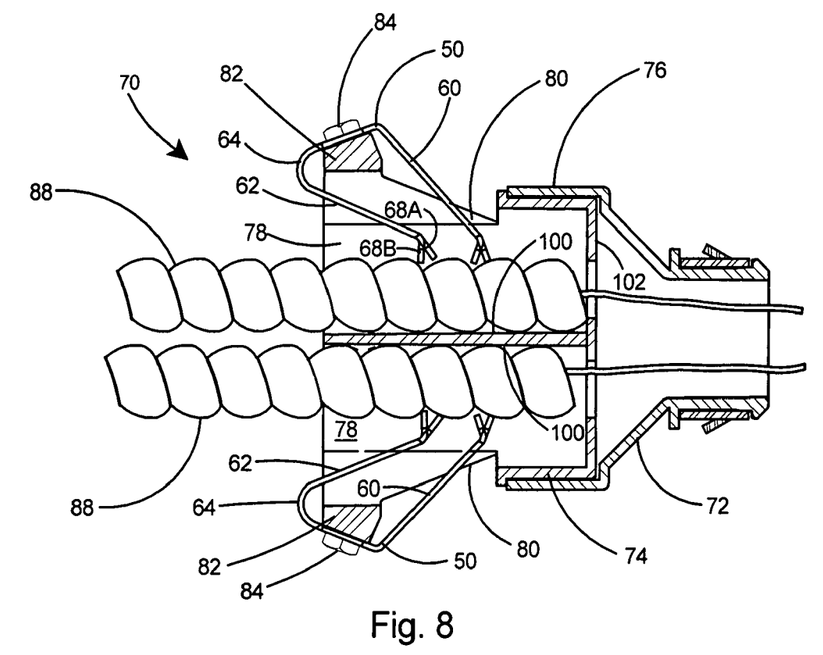
FIG. 8 is a sectional view of a duplex electrical fitting identical to that shown in FIG. 7 but with two larger trade size electrical cables inserted therein in the trailing end of the fitting.

Referring to FIGS. 7 and 8 there are shown duplex electrical fittings 70 which comprise a second embodiment of an electrical fitting according to the present invention. The duplex fitting 70 includes a leading body portion 72 and a trailing body portion 74 that join to form a connector body 76. It functions similar to the first embodiment of the electrical fitting but includes two trailing openings 78, two open channels 80, and two bridges 82 bridging the open channels 80. A tandem tang 50, which is identical to the tandem tang used in the first embodiment, is secured by a fastener 84 to each of the bridges 82. Thus, the duplex fitting 70 can accept two electrical cables 86 therein, as shown in FIG. 7, to connect to a single knockout opening in a panel or an electrical box (not shown). As shown in FIG. 8, the duplex electrical fitting 70 can also accept a wide range of cable diameters. Large diameter electrical cables 88 are shown inserted in the trailing openings 78 of the connector body 76.

Figure 9:
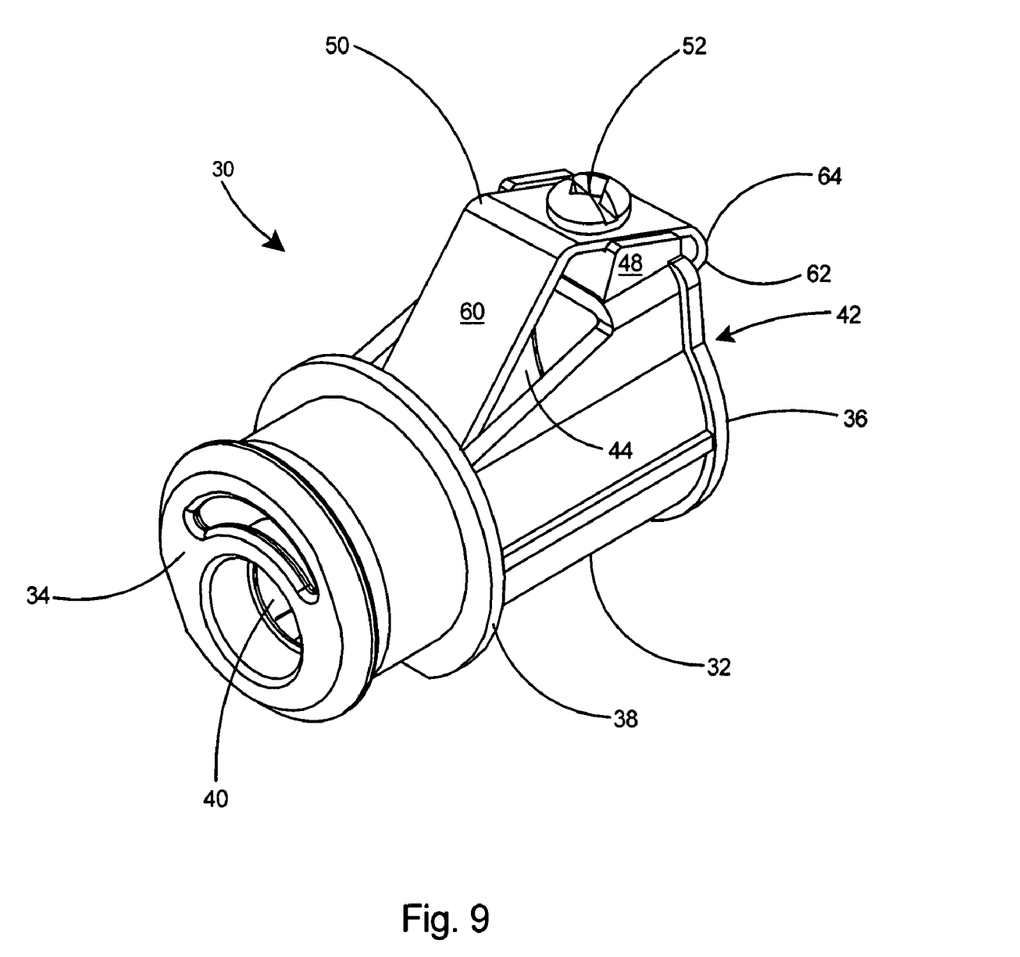
FIG. 9 is a perspective view of the electrical fitting of FIG. 1 including an improved tandem tang according to the present invention.

With reference to FIG. 9 there is shown a electrical fitting 30 according to the present invention for connecting a single electrical cable (not shown) to a knockout opening of a panel or electrical box. The electrical fitting 30 includes a connector body 32 including a leading end 34 and a trailing end 36 and an intermediate flange 38. A leading opening 40 is provided at the leading end 34 of the connector body 32. A bridge 48 extends over an open channel 44 of the connector body 32. A tandem tang 50 is secured to the bridge 48 by a fastener 52. The leading tang 60 extends into the open channel 44 and the trailing tang 62 with arcuate-shaped portion 64 extends into the trailing opening 42 at the trailing end 36 of the electrical fitting 30.

Figure 10:
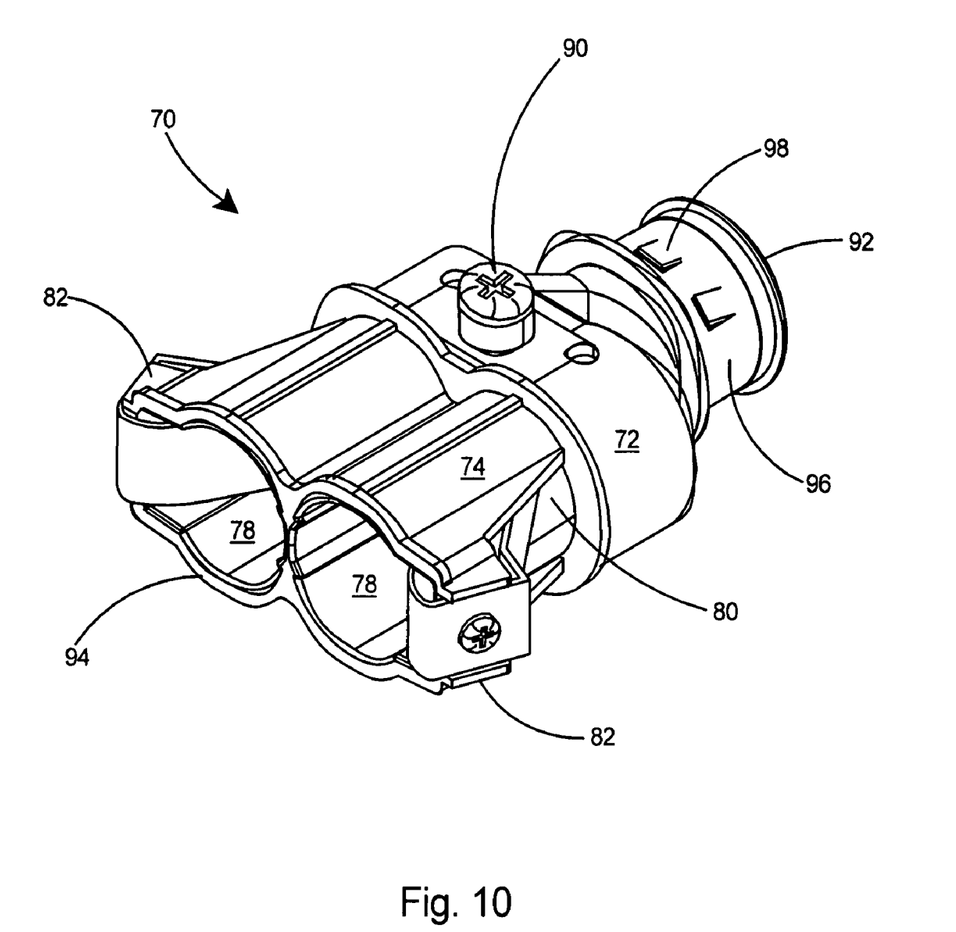
FIG. 10 is a perspective view of the duplex electrical fitting of FIG. 7 including two improved tandem tangs according to the present invention.

Referring to FIG. 10 there is shown a duplex fitting 70 with a leading body portion 72, a trailing body portion 74, and two trailing openings 78. The duplex fitting 70 includes two of the improved tandem tangs 50 of the current invention. One tandem tang 50 is secured to each bridge 82 that bridges or spans the respective open channel 80 on opposite sides of the duplex fitting 70. The two body portions 72 and 74 are secured together with fastener 90. The duplex fitting 70 includes a leading end 92 and a trailing end 94 and is depicted with a spring steel connecting ring 96 on the leading end 92. The connecting ring 96 includes one or more outward directed tangs 98 on the leading end 92 of the fitting 70.

Figure 11:
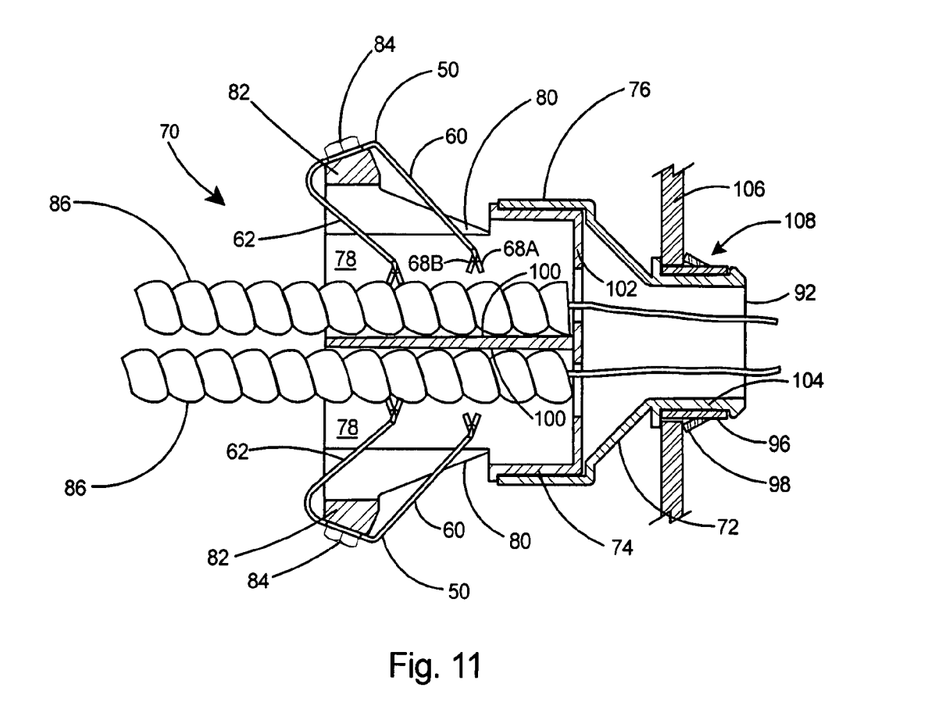
FIG. 11 is a sectional view of the duplex electrical fitting of FIG. 10 including a ring with an outward extending tang for securing the leading end of the electrical fitting to a panel or electrical box.

With reference to FIG. 11 there is depicted a sectional view of the duplex fitting of FIG. 10. The duplex fitting 70 includes the leading body portion 72, trailing body portion 74, trailing openings 78, bridges 82, open channels 80 and channel bottoms 100. The tandem tangs 50 are secured to the bridges 82 by fasteners 84. As shown in FIG. 11, each bridge 82 inclines the respective tandem tang 50 to angle the leading and trailing tangs 60 and 62 toward the leading end 92 of the duplex fitting 70. The leading tang 60 is therefore positioned closer to the leading end 92 than is the trailing tang 62. The legs 68A and 68B at the end of each tang 60 and 62 are positioned toward the channel bottoms 100 of each open channel 80.

Referring to FIG. 7, when an electrical cable 86 of the depicted diameter is inserted in the trailing opening 78, the tandem tang 50 forces the cable against the channel bottom 100. Trailing tang 62 of tandem tang 50 is engaged by the narrow diameter cable 86 depicted in FIG. 7. The electrical cable 86 advances until it engages a leading wall 102 of the trailing body portion 74. The advantage realized by the improved tandem tang 50 of the present invention is easier insertion of the electrical cable 86 as a result of the arcuate-shaped portion 64 of the trailing tang 62. With the improved tandem tang 50 of the present invention, less insertion force is required by the installer when inserting an electrical cable 86 into the duplex fitting 70.

FIG. 8 depicts the same duplex fitting 70 as shown in FIG. 7 but with a larger diameter electrical cable 88 inserted therein into the trailing openings 78. In the case of the larger diameter cable 88, both the trailing tang 62 and leading tang 60 engage the cable 88. Although cable 88 is of larger diameter, less insertion force is required to insert the cables 88 into the fitting 70 as the arcuate-shaped portion 64 of the trailing tang 62 enables the trailing tang 62 to flex easier than prior art versions of the trailing tang which were bent at an acute angle (not shown) in earlier versions of the tandem tang.

FIG. 11 depicts the duplex fitting 70 with a connecting ring 96 secured to the nose portion 104 at the leading end 92 of the fitting. The fitting 70 is shown secured to an electrical panel 106 by the outward directed tangs 98 of the connecting ring 96. The connecting ring 96 is the first embodiment of an attachment arrangement 108 for securing the various embodiments of the electrical fitting of the present invention to an electrical panel 106 or electrical box.

Figure 12:
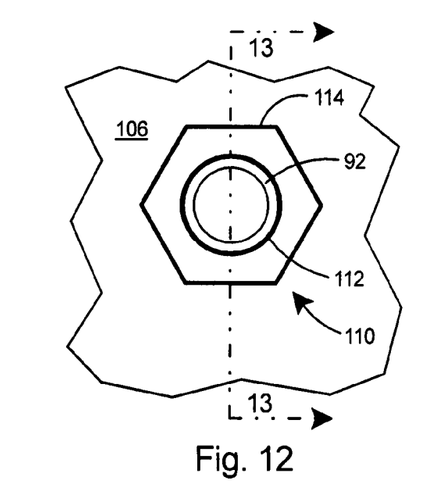
FIG. 12 is a front view of a duplex electrical fitting including a threaded nose portion and a locknut for securing the leading end of the electrical fitting to a panel or electrical box.
Figure 13:
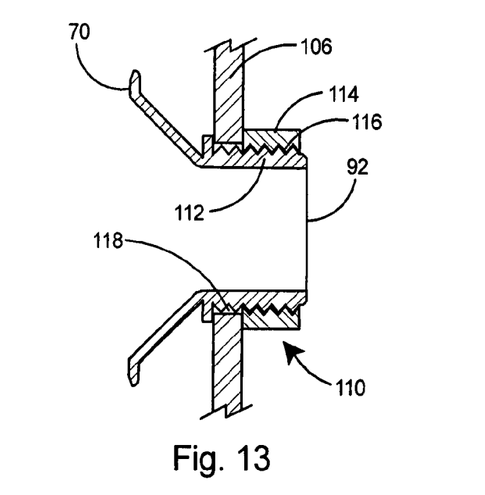
FIG. 13 is a sectional view of the duplex electrical fitting of FIG. 12 depicting the threaded nose portion and locknut for securing the leading end of the electrical fitting to a panel or electrical box.

FIGS. 12 and 13 depict a second embodiment of the attachment arrangement 110 for securing the electrical fittings of the present invention to an electrical panel 106 or electrical box. The attachment arrangement 110 includes a threaded nose portion 112 on the leading end 92 of the fitting 70 and a locknut 114 with interior threads 116 complimentary to the threads on the fitting 70. The nose portion 112 of the fitting 70 is simply pressed into the knockout hole 118 and the locknut 114 then tightened onto the threaded nose portion 112 to secure the fitting 70 to the panel 106.

The connector body 32 of electrical fitting 30 (see FIG. 9) and the leading body portion 72 and trailing body portion 74 of duplex fitting 70 (see FIG. 10) are preferably constructed of a conductive metal such as steel, zinc, galvanized steel, or aluminum. The connector body 32 and body portions 72 and 74 of the present invention are typically formed by die-casting and die-casting alloys are the most preferred material of construction. A most preferred material of construction for the connector body 32 and body portions 72 and 74 is Zamak™, a casting alloy comprised mainly of zinc alloyed with aluminum, magnesium, and copper and available from Eastern Alloys, Maybrook, N.Y. By constructing the tubular body of Zamak™ or other appropriate metals, the electrical fittings disclosed herein will be electrically conductive and provide good continuity throughout the fitting.

Figure 5:
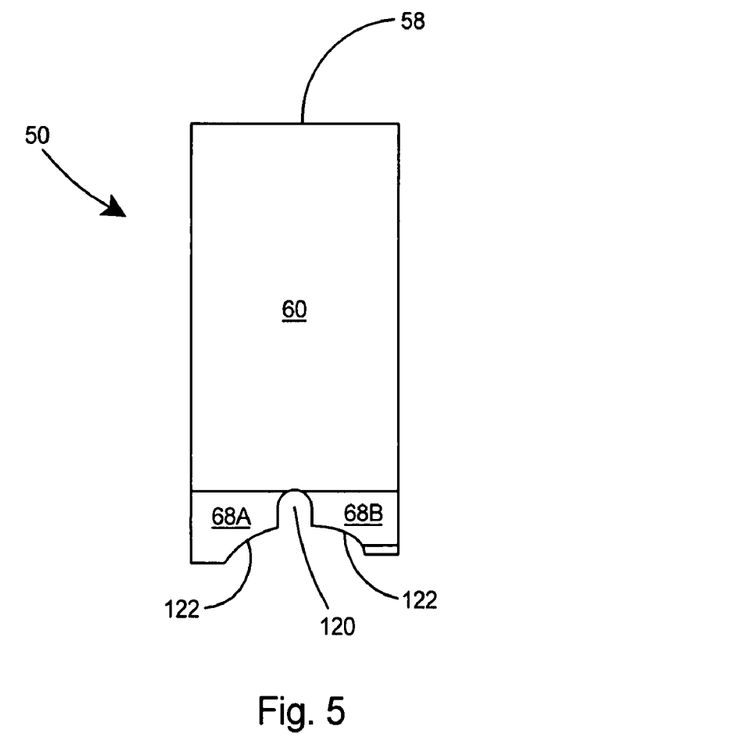
FIG. 5 is an end view of the tandem tang depicted in FIG. 4.
Figure 6:
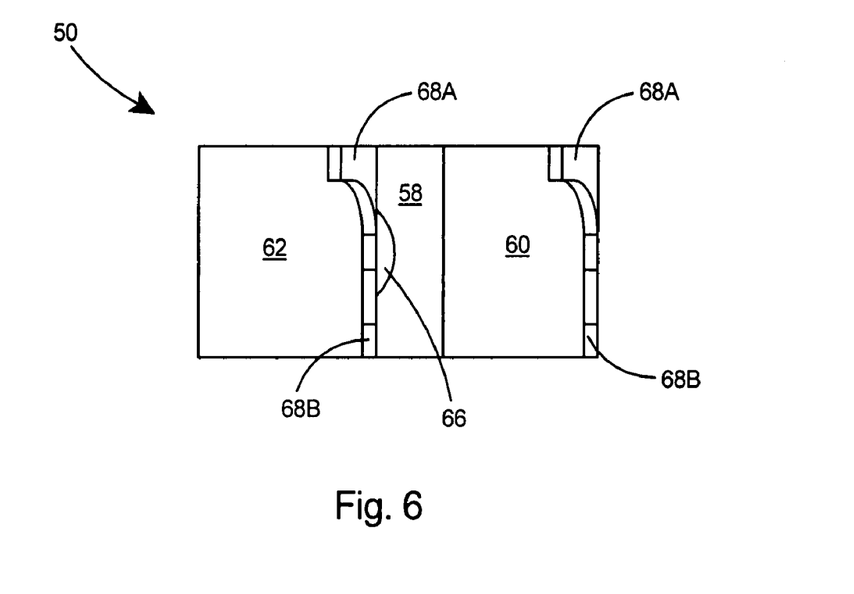
FIG. 6 is a bottom view of the tandem tang depicted in FIG. 4.

Referring to FIG. 5, the legs 68A and 68B of the tandem tang 50 are separated by a semicircular notch 120. The semicircular notch 120 is centered on the lower end of each tang 60 and 62 and approximates the outer curvature of the portion of a cable (not shown) that the lower end of the tang 60, 62 will seat within. The legs 68 will seat in a groove of the cable (see FIGS. 7 and 8). Since the electrical fittings of the present invention accommodate several trade sizes of cable, the legs 68A and 68B include an arcuate surface 122 that provides optimal surface contact with each trade size of cable.

The tandem tang 50 is preferably constructed of spring steel and is electrically conductive. Constructing the body portions 22, 72, and 74 of zinc alloy and the tandem tang 50 of spring steel enables the electrical fitting to establish excellent electrical continuity between the metallic-sheathed cable, and the panel or electrical box it is connected to.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical fitting for connecting electrical cable to a panel or electrical box comprising:
    a connector body including a leading end and a trailing end separated by an intermediate flange;
    said connector body including a leading opening at said leading end and a trailing opening at said trailing end;
    an attachment arrangement on said leading end for securing said electrical fitting to the panel or electrical box;
    said trailing end of said connector body including an open channel, said open channel extending from said trailing opening to said flange, said open channel including a bottom therein;
    said connector body including a bridge adjacent said trailing opening, said bridge extending across said open channel;
    a tandem tang secured to said bridge of said connector body; and
    said tandem tang including a common middle portion, a leading tang, a trailing tang, and an arcuate-shaped portion connecting said common middle portion and said trailing tang.

2. The electrical fitting of claim 1 wherein said arcuate-shaped portion connecting said common middle portion and said trailing tang includes a radius of at least 0.10 inch.

3. The electrical fitting of claim 1 wherein said leading tang and said trailing tang include a cable grabbing end for contacting and holding a cable against said bottom of said open channel.

4. The electrical fitting of claim 3 wherein said leading tang directs said cable grabbing end towards the cable thereby holding the cable against said bottom of said open channel.

5. The electrical fitting of claim 1 wherein said common middle portion of said tandem tang includes an aperture therein for receiving a fastener therein for securing said tandem tang to said connector body.

6. The electrical fitting of claim 1 wherein said tandem tang is bent at one end of said common middle portion at a first angle to form said leading tang.

7. The electrical fitting of claim 1 wherein said attachment arrangement on said leading end of said connector body is a connecting ring.

8. The electrical fitting of claim 1 wherein said attachment arrangement includes
    a threaded nose portion on said leading end of said connector body; and
    a lock nut for engaging said threaded nose portion.

* * * * *